(12) United States Patent
Murata (10) Patent No.: US 9,777,757 B2
(45) Date of Patent: Oct. 3, 2017

(54) FIXTURE

(71) Applicant: OMRON Corporation, Kyoto-shi, Kyoto (JP)

(72) Inventor: Kenji Murata, Kishiwada (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/058,394

(22) Filed: Mar. 2, 2016

(65) Prior Publication Data
US 2016/0265565 A1 Sep. 15, 2016

(30) Foreign Application Priority Data

Mar. 13, 2015 (JP) .................................. 2015-050724

(51) Int. Cl.
| | |
|---|---|
| *F16M 13/00* | (2006.01) |
| *F16B 2/06* | (2006.01) |
| *G02B 6/36* | (2006.01) |
| *F16M 13/02* | (2006.01) |

(52) U.S. Cl.
CPC ............ *F16B 2/065* (2013.01); *F16M 13/02* (2013.01); *G02B 6/3616* (2013.01); *G02B 6/3624* (2013.01)

(58) Field of Classification Search
USPC ....................................................... 248/511
See application file for complete search history.

(56) References Cited

U.S. PATENT DOCUMENTS

| | | | | |
|---|---|---|---|---|
| 4,148,113 A | * | 4/1979 | Dvorachek | ............. F16L 3/223 24/16 R |
| 4,442,994 A | * | 4/1984 | Logsdon | ................... F16L 3/12 248/547 |
| 4,653,782 A | * | 3/1987 | Munday | ................ F16L 55/172 285/15 |
| 4,934,635 A | * | 6/1990 | Sherman | ................... F16L 3/10 24/279 |
| 5,020,195 A | * | 6/1991 | LeVahn | .................. A61B 17/02 24/514 |
| 6,152,412 A | * | 11/2000 | Basickes | ................. F16L 3/127 248/317 |

(Continued)

FOREIGN PATENT DOCUMENTS

JP 2012-078530 A 4/2012

*Primary Examiner* — Monica Millner
(74) *Attorney, Agent, or Firm* — Metrolexis Law Group. PLLC (57) ABSTRACT

A fixture includes a base portion and a pair of holding portions on the base portion. Each holding portion include a clamping portion for clamping an object, and a head portion on the clamping portion side opposite to the base portion side. Each head portion includes a through-hole for a fastening member for adjusting a gap between the holding portions. The rigidity of the clamping portions is smaller than the rigidity of the head portions, with respect to deformation caused by the fastening member. The distance from the base portion to end portions of the holding portions in a plane orthogonal to the axial direction of the object is determined according to the tolerance prescribed for the object. The gap when external force is not being applied by the fastening member is determined according to an allowable amount of stress to be applied to the object.

8 Claims, 7 Drawing Sheets

(56) References Cited

U.S. PATENT DOCUMENTS

| | | | |
|---|---|---|---|
| 6,164,604 A * | 12/2000 | Cirino | F16L 3/1075 |
| | | | 248/74.3 |
| 9,078,635 B2 * | 7/2015 | Menendez | A61B 17/02 |
| 9,169,961 B1 * | 10/2015 | Jiang | F16M 11/12 |
| 9,546,744 B2 * | 1/2017 | Patil | F16L 3/24 |
| 2002/0022764 A1 | 2/2002 | Smith et al. | |
| 2005/0163561 A1 * | 7/2005 | Weger | F16L 3/24 |
| | | | 403/289 |
| 2006/0093269 A1 * | 5/2006 | Willis | G02B 7/003 |
| | | | 385/52 |
| 2007/0040075 A1 * | 2/2007 | Moretto | F16L 3/1066 |
| | | | 248/67.7 |
| 2013/0219678 A1 * | 8/2013 | Brewster | F16B 2/065 |
| | | | 24/486 |

\* cited by examiner

FIXTURE

CROSS-REFERENCES TO RELATED APPLICATIONS

This application claims priority to Japanese Patent Application No. 2015-050724 filed Mar. 13, 2015, the entire contents of which are incorporated herein by reference.

FIELD

The present invention relates to a fixture for fixing a tube-shaped object.

BACKGROUND

Various types of sensors are used at manufacturing sites and the like, and such sensors need to be fixed in position so as to not be influenced by vibration generated by manufacturing apparatuses and the like, for example. In other words, such sensors need to be fixed so as to prevent deviation from a detection range, a detection temperature, or the like that has been set in advance. One example of such a sensor is a photoelectric sensor that emits light and detects the presence or absence of a detection target, the state of a surface, or the like based on reflected light. There are cases where a fiber head for emitting light and receiving reflected light is used in a photoelectric sensor, and this fiber head needs to be appropriately fixed. Note that in the case where optical fiber constitutes the portion from the main body of the photoelectric sensor to the portion for actually emitting and receiving light, the fiber head is the member that is connected to the terminal of that optical fiber. One example of a configuration related to a fiber head is a clamp device disclosed in JP 2012-078530A (Patent Document 1), and this clamp device holds the plug portion of an optical fiber cable.

JP 2012-078530A is an example of related art.

In the configuration disclosed in aforementioned JP 2012-078530A, an insertion hole is formed in a housing, and a plug portion of an optical fiber cable is inserted into the insertion hole (insertion portion), thus fixing the optical fiber cable.

However, actual optical fiber cables have a margin of error caused by manufacturing variance (this margin of error will also be referred to hereinafter as "tolerance"), and if such tolerance is taken into consideration, the insertion hole (insertion portion) needs to be created with a slightly larger inner diameter, thus making it difficult to perform appropriate fixing.

Conversely, performing appropriate fixing requires the inner diameter to be reduced, and there is a possibility of damaging the object to be fixed in such a case.

For this reason, there is desire for a fixture that, even in the case of a tube-shaped object that has a certain extent of tolerance, can appropriately fix the object without damaging the object.

SUMMARY

A fixture according to one aspect of the present invention is for fixing a tube-shaped object. The fixture includes a base portion and a pair of holding portions provided on the base portion. The holding portions each include a clamping portion for coming into contact with the object and clamping the object, and a head portion that is provided on a side of the clamping portion that is opposite to a side on which the base portion is located, and is provided with a through-hole for passage of a fastening member for adjusting a gap between the pair of holding portions. The clamping portions and the head portions are configured such that a rigidity of the clamping portions with respect to deformation applied by the fastening member is smaller than a rigidity of the head portions with respect to the deformation. A distance from the base portion to end portions of the holding portions in a plane orthogonal to an axial direction of the object is determined according to a tolerance prescribed for the object, and the gap between the pair of head portions when external force is not being applied by the fastening member is determined according to an allowable amount of stress that can be applied to the object.

It is preferable that a thickness of the clamping portions in the plane orthogonal to the axial direction of the object is configured to be smaller than a thickness of the head portions extending from the clamping portions.

It is preferable that the distance from the base portion to the end portions of the holding portions is determined such that an amount of flexure that occurs at a position where the object is arranged is greater than or equal to ½ the tolerance of the object.

It is preferable that the gap between the pair of head portions is determined such that stress that is applied to the object when the fastening member causes flexure for causing the pair of head portions to come into contact with each other is less than or equal to an allowable value.

It is preferable that the clamping portions are configured to conform to a shape of an outer peripheral surface of the object.

It is further preferable that a cross-sectional shape of the object is cylindrical or polygonal.

It is further preferable that the holding portions each further include an extension portion provided between the clamping portion and the base portion.

It is preferable that the through-holes are provided at positions in the head portions that are more in a vicinity of an end on a side opposite to a side on which the base portion is located.

With a fixture according to an aspect of the present invention, even in the case of a tube-shaped object that has a certain extent of tolerance, it is possible to appropriately fix the object without damaging the object.

DETAILED DESCRIPTION

An embodiment of the present invention will be described below in detail with reference to the drawings. Note that like or corresponding portions in the drawings are denoted by like reference signs, and redundant descriptions will not be given for them.

A cylindrical fiber head for use in a photoelectric sensor or the like is taken as an example of a tube-shaped object in the description of the present embodiment, but there is no limitation to a fiber head, and the present invention is applicable to various types of objects.

A. Related Technology

Figure 1A:
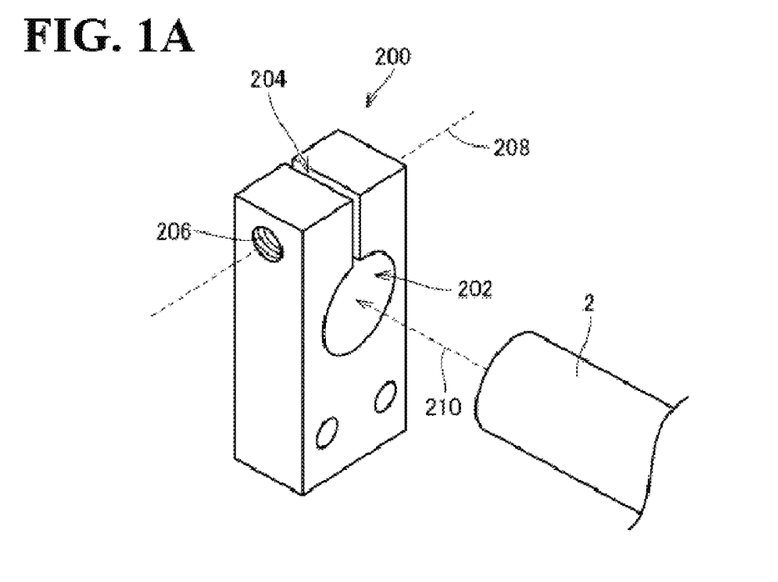
FIGS. 1A and 1B are schematic diagrams showing examples of fixtures according to technology related to the present invention.
Figure 1B:
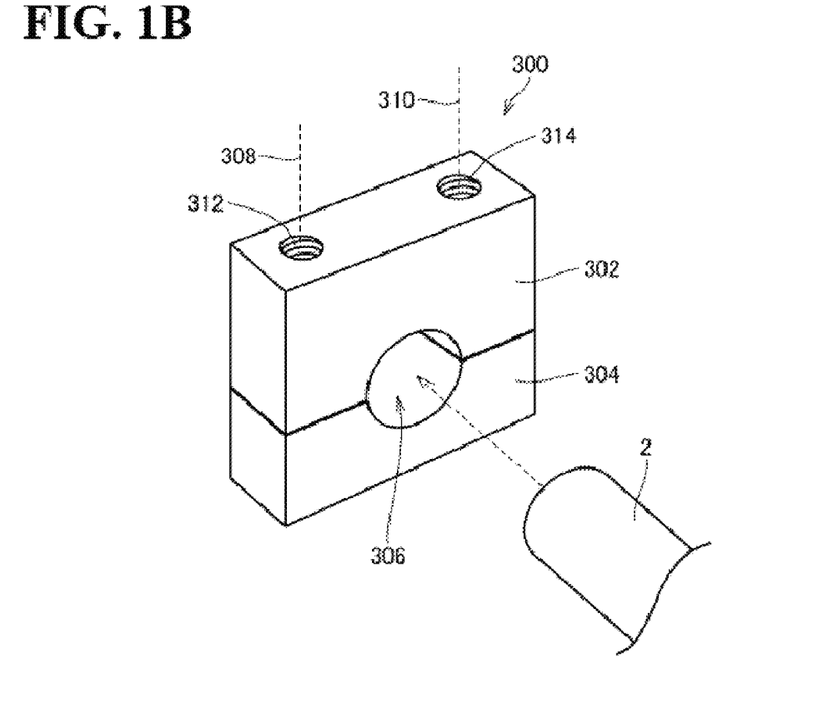

Before describing a fixture according to the present embodiment, the following describes technology related to the present invention. FIGS. 1A and 1B are schematic diagrams showing examples of fixtures according to technology related to the present invention.

FIG. 1A shows a fixture 200, which is an example of a one-point fixture. The fixture 200 is provided with a hole portion 202 for the passage of an object 2 that is to be fixed. The object 2 is inserted into the hole portion 202 along a central axis 210 of the object 2. A slit 204 is formed by cutting out a portion to the circle formed by the hole portion 202. A through-hole 206 for the passage of a bolt, which is a fastening member for decreasing the size of the gap of the slit 204, is provided at an approximately central position in the surfaces that oppose each other across the slit 204. The bolt is inserted along a passage direction 208, and then the bolt is fastened with a nut, thus generating stress in the entirety of the fixture 200. The inner diameter of the hole portion 202 decreases due to this stress, and therefore the force of contact with the object 2 increases, and the object 2 is fixed by the fixture 200. A configuration may be employed in which the two sides of the through-hole 206 at positions sandwiching the slit 204 are constricted by a bolt and a nut, or a configuration may be employed in which a thread is formed in the inner surface of one side of the through-hole 206 so as to function as the nut mated with the bolt.

FIG. 1B shows a fixture 300, which is an example of a multi-point fixture. The fixture 300 is constituted by an upper member 302 and a lower member 304, and these members are joined together by being constricted using two or more fastening members such as screws. The upper member 302 and the lower member 304 are configured such that a hole portion 306, which is for the passage of the object 2 that is to be fixed, is formed when the upper member 302 and the lower member 304 are joined together. The object 2 is inserted into the hole portion 306 along a central axis 316 of the object 2.

Through-holes 312 and 314 are formed so as to pass through the upper member 302 and the lower member 304. A thread is formed in the inner surfaces of the through-holes 312 and 314. By inserting screws into the through-holes 312 and 314 along passage directions 308 and 310, which are the extending directions of the through-holes 312 and 314, the size of the gap between the upper member 302 and the lower member 304 is reduced, and therefore the force of contact with the object 2 increases, and the object 2 is fixed by the fixture 300.

Management of the constricting torque is important in both the one-point fixture 200 shown in FIG. 1A and the multi-point fixture 300 shown in FIG. 1B. Specifically, in both of the fixtures, stress corresponding to constricting torque generated by the fastening member(s) directly acts on the object 2 that is to be fixed. In other words, the constricting torque applied to the fastening member directly becomes a load on the object 2. Accordingly, the object 2 is required to have rigidity greater than or equal to the constricting torque applied to the fastening member(s). The object 2 becomes damaged if stress (constricting torque) exceeding the rigidity of the object 2 is applied thereto, and therefore control of the constricting torque using a torque wrench or the like is necessary.

On the other hand, the outer diameter and the like of the object 2 has a margin of error (tolerance) to a certain extent caused by manufacturing variance. Even in the case where the constricting torque is controlled, problematic stress is applied to the object 2 if the tolerance is large. Also, with the one-point fixture 200 shown in FIG. 1A, the inner surface of the hole portion 202 can only be displaced by an amount corresponding to the width of the slit 204, and since this amount of displacement is relatively small, only an object 2 with a small tolerance can be fixed. Also, with the multi-point fixture 300, the load applied to the object 2 is unbalanced unless approximately the same constricting torque is applied to the fastening members that pass through the through-holes 312 and 314.

As described above, with the fixtures according to related technology, there is a possibility that excessive stress will be applied to the object 2, and there is an issue in that there is a limitation regarding the amount of tolerance that is allowed.

For example, there are cases where the covering of the fiber head is subjected to resin treatment (typically, Teflon (registered trademark) treatment), and there is a large amount of variance in the outer diameter of a fiber head that has been subjected to such resin treatment. For example, in the case of using the multi-point fixture 300 shown in FIG. 1B, with an object 2 whose outer diameter has the maximum value within the tolerance, an issue of being excessively constricted (subjected to excessive stress) can arise, whereas with an object 2 whose outer diameter has the minimum value within the tolerance, an issue of not being able to be sufficiently constricted (not being able to be sufficiently fixed) can arise.

An object of a fixture according to the present embodiment is to overcome the above-described issues in related technology, and to appropriately fix even a tube-shaped object 2 that has a certain extent of a tolerance, without damaging the object 2.

B. Basis Examination

Figure 2A:
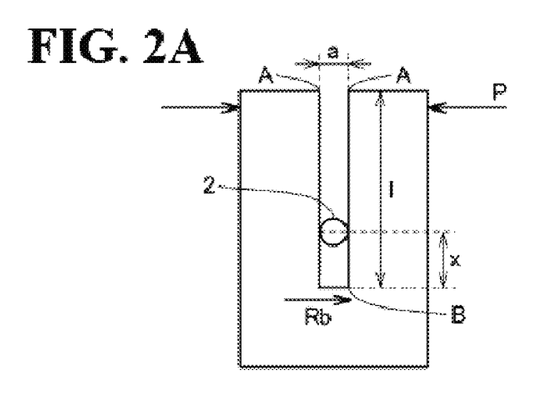
FIGS. 2A and 2B are schematic diagrams showing structure models for examining the sizes of portions of a fixture according to an embodiment.
Figure 2B:
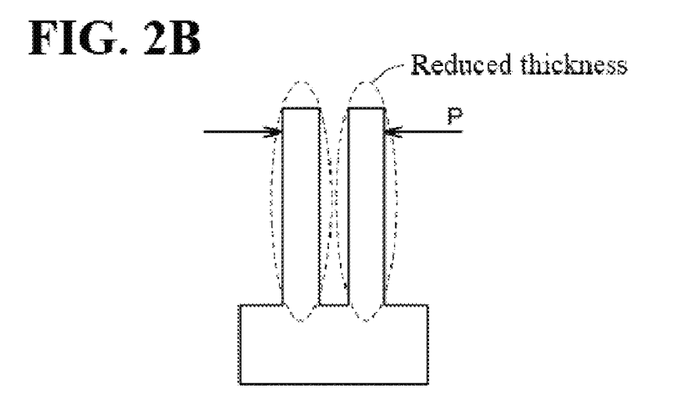

FIGS. 2A and 2B are schematic diagrams showing structure models for examining the sizes of portions of a fixture according to the present embodiment. FIG. 2A shows a structure model that is a simplified structure of a one-point fixture (typically, the fixture 200 shown in FIG. 1A). The fixture 200 shown in FIG. 1A has a configuration in which the slit 204 (cutout portion) is formed in a portion of the circle formed by the hole portion 202, and the object 2 is fixed by inserting a bolt (fastening member) into the through-hole 206 and tightening the bolt, and this configuration can be modeled as simple cantilevers as shown in FIG. 2A. In other words, the stress applied to the object 2 can be calculated according to a stress calculation in a cantilever model.

First, a total load W generated in the fixture matches a force P generated when the bolt (fastening member) is tightened with a prescribed constricting torque. In other words, Expression 1 below holds true.

$$W = P \qquad \text{Exp. 1}$$

A reaction force Rb along a surface B has the same magnitude as a shearing force Qb along the surface B, and the action directions of these forces are opposite to each other. Also, the reaction force Rb along the surface B also matches the force P generated when the bolt (fastening member) is tightened with a prescribed constricting torque. In other words, Expression 2 below holds true.

$$Rb = -Qb = P \qquad \text{Exp. 2}$$

In the structure model shown in FIG. 2A, it is assumed that the object 2 is arranged at a position that is a distance x from the surface B. Accordingly, a bending moment Mx at the position where the object 2 is arranged (the position that is the distance x from the surface B) is proportional to the product of the force P generated when the bolt (fastening member) is tightened with a prescribed constricting torque and the distance x from the surface B. Similarly, a bending moment Ma at a point A is proportional to the product of the force P generated when the bolt (fastening member) is tightened with a prescribed constricting torque and a length 1 from the surface B to the point A. In other words, Expressions 3 and 4 below hold true.

$$Mx = -P \times x \qquad \text{Exp. 3}$$

$$Ma = -P \times l \qquad \text{Exp. 4}$$

Next, a rotation angle θx and a flexure δx at the position that is the distance x from the surface B, as well as a rotation angle θA and a flexure δA at the point A can be calculated in accordance with a beam flexure calculation expression using the bending moment Ma at the point A (=−P×l), a Young's modulus E, and a second moment of area I, as shown in Expressions 5 to 8 below.

$$\theta A = -(P \times l^2)/(2 \times E \times I) \qquad \text{Exp. 5}$$

$$\theta x = -(P \times (l^2 - x^2))/(2 \times E \times I) \qquad \text{Exp. 6}$$

$$\delta x = ((P \times l^3)/(3 \times E \times I)) \times (1 - (3 \times x/2 \times l) + (x^3/2 \times l^3)) \qquad \text{Exp. 7}$$

$$\delta A = (Pl^3)/(3 \times E \times I) \qquad \text{Exp. 8}$$

Assuming that the object 2 is fixed at the position that is the distance x from the surface B, the relationship between the tolerance of the object 2 and the flexure δx can be either of the following two cases.

$$\text{object 2 tolerance} \leq 2\delta x \qquad \text{Exp. 9}$$

$$\text{object 2 tolerance} > 2\delta x \qquad \text{Exp. 10}$$

When Expression 9 holds true, the flexure δx includes the entire range of the tolerance of the object 2, and therefore the object 2 is fixed. In contrast, when Expression 10 holds true, the flexure δx can fall outside the tolerance of the object 2, and therefore the object 2 may not be fixed. In other words, in order to fix the object 2, the sizes and the like of the various portions need to be designed such that Expression 9 holds true.

On the other hand, when the points A undergo flexure due to the force P, and the points A come into contact with each other, stress higher than the stress at that time cannot be generated in the object 2. In other words, a gap "a" between the points A defines the maximum value of stress that can be applied to the object 2. More specifically, the condition shown in Expression 11 below becomes necessary.

$$2\delta A = a \qquad \text{Exp. 11}$$

By determining the length l and the gap "a" so as to satisfy both Expressions 9 and 11 above, even if the object 2 has a tolerance, the object 2 can be sufficiently fixed, and it is possible to determine a positional relationship according to which more fixing torque than is necessary is not applied to the object 2.

Note that the structure model shown in FIG. 2A corresponds to the fixture 200 shown in FIG. 1A, and has an issue in that the allowable tolerance of the object 2 that can be fixed cannot be high. In other words, if the tolerance of the object 2 is reduced, an object 2 with a high amount of tolerance variance cannot be fixed.

In view of this, in the fixture according to the present embodiment, the portions that come into contact with the object 2 are designed so as to more easily undergo flexure, thus expanding the range of allowable tolerance. More specifically, by reducing the second moment of area of the portions that fix the object 2, a larger amount of flexure (amount of bending deflection) occurs, and thus the portions more easily undergo deformation.

For example, by employing a structure model such as that shown in FIG. 2B, the portions that come into contact with the object 2 can more easily undergo flexure. As shown in FIG. 2B, by halving the thickness of the beam portions, the flexure δx that occurs at the position that is the distance x from the surface B becomes 8 times the flexure in the structure model in FIG. 2A, and the range of the allowable tolerance of the object 2 is expanded to 8 times the range in the structure model in FIG. 2A.

Also, rather than a best resolving means for uniformly reducing the thickness of the entire beam, a shape is preferable in which only the portions that fix the object 2 are made flexible, and the other portions do not undergo much deformation. For this reason, as illustrated in later-described FIGS. 3A to 3C and 5A to 5C, in the fixture according to the present embodiment, the portions that fix the object 2 are reduced in thickness so as to more easily undergo flexure, and the other portions are increased in thickness so as to not easily undergo deformation.

Specifically, an object of the fixture according to the present embodiment is to appropriately fix an object 2 whose outer diameter has a relatively large amount of variance, such as a cylindrical fiber head whose surface has been subjected to resin treatment, and this fixture employs a configuration in which the amount of flexure in the portions that clamp the object 2 is increased, and the stress applied to the object 2 is prevented from becoming concentrated. To achieve this configuration that easily undergoes flexure, a technique is applied in which 1) the length of the slit defined by portions of the pair of beams is set according to the tolerance that can occur in the object 2, and 2) the thickness of these portions of the beams is smaller than the other portions.

The following describes examples of specific structures of the fixture according to the present embodiment.

C. Examples of Structures of Fixture According to Present Embodiment

The fixture according to the present embodiment is used to fix a tube-shaped object. The cross-sectional shape of the object is not limited to being cylindrical, and it may be any polygonal shape (e.g., quadrangular, hexagonal, or octagonal), or it may be a shape that is a combination of straight lines and curved lines.

Also, the fixture according to the present embodiment is typically constituted one type of metal. It is constituted by stainless steel, any of various types of alloys, or the like in consideration of corrosion resistance, thermal stability, and the like. Note that it is sufficient to select an appropriate material in consideration of the usage environment, cost, satisfaction of the above-described conditions, and the like. A non-metallic material may be employed, or a configuration using a combination of multiple materials may be employed.

c1: First Structure Example

Figure 3A:
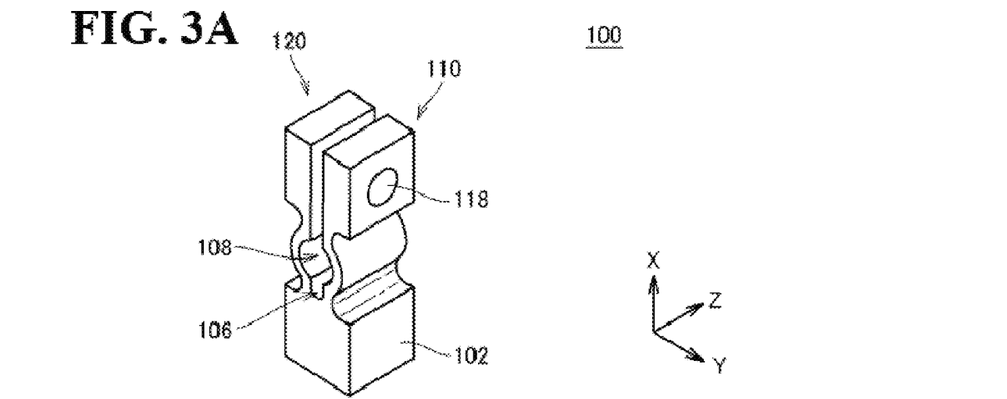
FIGS. 3A to 3C are schematic diagrams showing a first structure example for a fixture according to the embodiment.
Figure 3B:
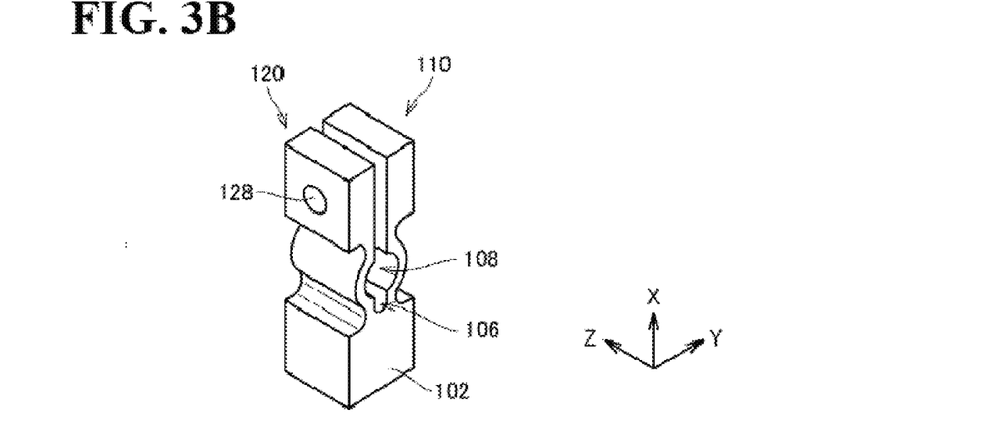
Figure 3C:
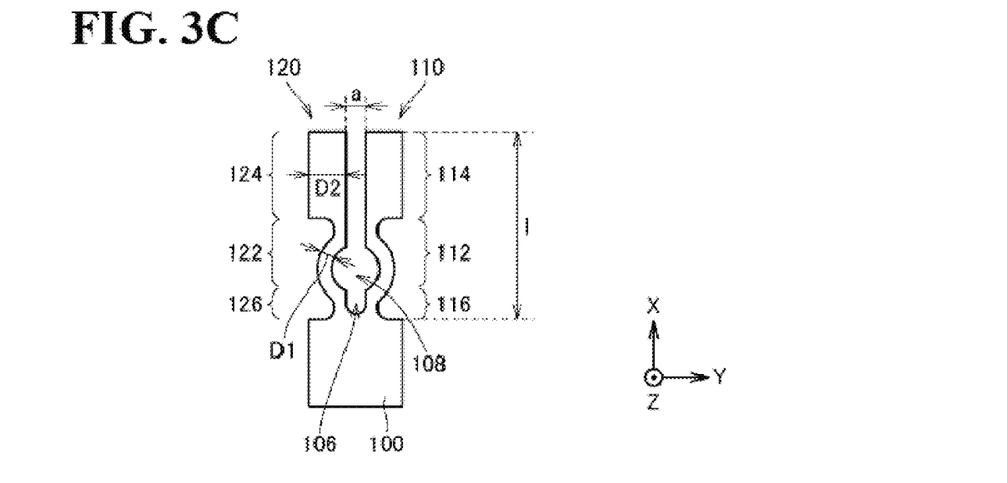
Figure 4:
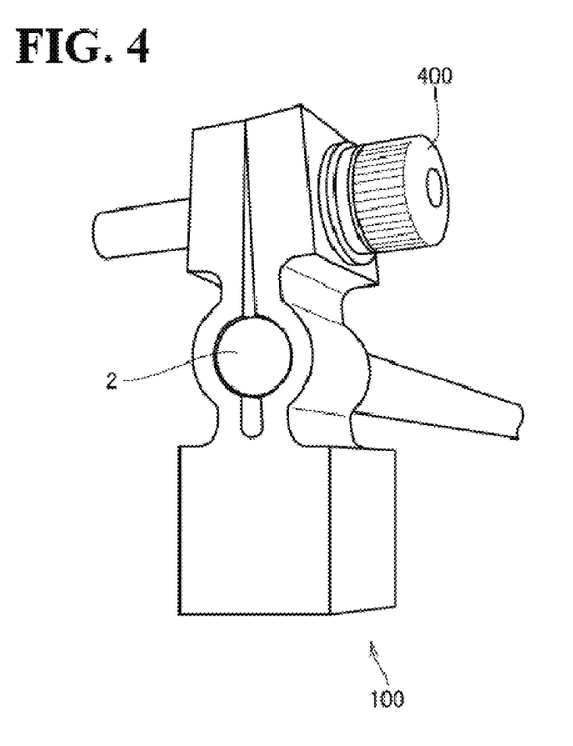
FIG. 4 is a schematic diagram illustrating the use of the fixture shown in FIGS. 3A to 3C.

FIGS. 3A to 3C are schematic diagrams showing a first structure example for the fixture according to the present embodiment. FIG. 3A is a perspective view of the right side of the fixture 100, FIG. 3B is a perspective view of the left side of the fixture 100, and FIG. 3C is a cross-sectional plan view of the fixture 100. FIG. 4 is a schematic diagram illustrating the use of the fixture shown in FIGS. 3A to 3C.

As shown in FIGS. 3A to 3C, the fixture 100 is constituted by a base portion 102 and a pair of holding portions 110 and 120 that are provided on the base portion 102. The holding portions 110 and 120 include clamping portions 112 and 122 for coming into contact with the object 2 (not shown; see FIG. 4) and clamping the object 2, and head portions 114 and 124 that are provided on the side of the clamping portions 112 and 122 that is opposite to the side on which the base portion 102 is located. Through-holes 118 and 128, which are for the passage of a fastening member (typically a bolt and nut, or a screw) for adjusting the gap between the pair of holding portions 110 and 120, are provided in the head portions 114 and 124. Note that a configuration is possible in which a thread is formed in the inner surface of one of the through-holes 118 and 128, and that through-hole serves as the nut that is mated to the bolt.

A joining hole 108 that comes into contact with the object 2 is formed when the pair of holding portions 110 and 120 oppose each other. In FIGS. 3A to 3C, the object 2 is inserted into the joining hole 108 along a Z axis direction. Also, the fastening member passes through the through-holes 118 and 128 along a Y axis direction.

Here, as shown in FIG. 4, the fixture 100 is positioned on an apparatus, a platform, or the like, and the object 2 (a fiber head in this example) is fixed by the fixture 100. In the fixing of the object 2 by the fixture 100, stress on the object 2 is generated by constricting the head portions using a fastening member 400 (a screw in this example). Note that in the use shown in FIG. 4, the fixture 100 is a so-called fiber head fixture or shaft holder.

A cylindrical object such as a fiber head is envisioned as the object 2 fixed by the fixture 100, and therefore the joining hole 108 is formed so as to conform to the outer shape of the cylindrical object. In other words, it is preferable that the clamping portions 112 and 122 of the fixture 100 are configured to conform to the shape of the outer peripheral surface of the object 2. Note that in the case where the cross-sectional shape of the object is a polygonal shape or a shape that is a combination of straight lines and curved lines instead of being cylindrical, the clamping portions 112 and 122 are formed in accordance with the shape of that object 2. As shown in FIGS. 3A to 3C and 4, in the fixture 100, the clamping portions 112 and 122 and the head portions 114 and 124 are configured such that the rigidity of the clamping portions 112 and 122 with respect to deformation applied by the fastening member 400 is smaller than the rigidity of the head portions 114 and 124 with respect to the same deformation. In other words, these portions are designed such that the stress generated by constriction by the fastening member 400 does not become concentrated on the object 2, the deformation of the head portions 114 and 124 themselves is relatively small, and the deformation of the clamping portions 112 and 122 themselves is relatively large.

More specifically, in the configuration of the fixture 100, a thickness D1 of the clamping portions 112 and 122 in a plane orthogonal to the axial direction of the object 2 (Z axis direction), that is to say in the XY plane, is smaller than a thickness D2 of the head portions 114 and 124 that respectively extend from the clamping portions 112 and 122. This difference in thickness obtains a structure in which the clamping portions 112 and 122 more easily undergo flexure than the head portions 114 and 124. In other words, if the thickness of the clamping portion 112 is smaller than the thickness of the corresponding head portion 114, and the thickness of the clamping portion 122 is smaller than the thickness of the corresponding head portion 124, it is possible to realize a structure that easily undergoes flexure. It should be noted that it is preferable that the clamping portions 112 and 122 have the same thickness, that is to say that the pair of holding portions 110 and 120 are arranged symmetrically.

As one design example, in the case where an inner diameter $\phi$ of the joining hole 108 is 5.3 mm, the thickness D1 of the clamping portions 112 and 122 is designed to be 1.5 mm, and the thickness D2 of the head portions 114 and 124 is designed to be 4.05 mm.

Also, in the fixture 100, the length l from the base portion 102 to the end portions of the holding portions 110 and 120 in the plane orthogonal to the axial direction of the object 2 (Z axis direction), that is to say in the XY plane, is determined according to the tolerance defined for the object 2. As was described with reference to FIGS. 2A and 2B, in the fixture 100 according to the present embodiment, flexure occurs due to external force generated by the fastening member 400, and the amount of this flexure is dependent on the length of the pair of beams, that is to say the holding portions 110 and 120. Specifically, the longer the length l from the base portion 102 to end portions of the holding portions 110 and 120 is, the greater the amount of flexure that occurs is. The amount of flexure influences the cross-sectional diameter of the object 2 that can be fixed, and therefore the length 1 needs to be determined giving consideration to the tolerance (design tolerance and manufacturing tolerance) prescribed for the object 2.

More specifically, the fixture needs to be designed such that the relationship of Expression 9 described above, that is to say "object 2 tolerance≤2 δx" (δx: flexure occurring at position located distance x from base portion 102), holds true. In other words, Expression 9 is equivalent to "(½× object 2 tolerance)≤δx", and therefore the distance from the base portion 102 to the end portions of the holding portions 110 and 120 is determined such that the amount of flexure that occurs at the position where the object 2 is arranged is greater than or equal to ½ the object 2 tolerance.

Also, in the fixture 100, the gap "a" between the pair of head portions 114 and 124 in the plane orthogonal to the axial direction of the object 2 (Z axis direction), that is to say in the XY plane, when external force is not being applied by the fastening member 400 is determined according to the allowable amount of stress that can be applied to the object 2. In other words, the gap "a" between the pair of head portions 114 and 124 is designed such that the stress that is applied to the object 2 when the fastening member 400 generates flexure that enables the pair of head portions 114 and 124 to come into contact with each other is less than or equal to the allowable value. As one design example, the fixture needs to be designed such that the stress applied to the object 2 in the case where the relationship of Expression 11 described above, that is to say "2δA=gap "a" between head portions 114 and 124" (δA: flexure occurring at end portions of head portions 114 and 124), holds true does not exceed the limit of stress that is allowed to be applied to the object 2.

The base portion 102 and the end portions of the clamping portions 112 and 122 on one side may be configured so as to be integrated with each other, but in the fixture 100 shown in FIGS. 3A to 3C, extension portions 116 and 126 are provided between the base portion 102 and the clamping portions 112 and 122 in order to reduce the dimension of the fixture 100 in the X direction. In other words, the holding portions 110 and 120 further include the extension portions 116 and 126 that are provided between the base portion 102 and the clamping portions 112 and 122. It is preferable that the thickness of the extension portions 116 and 126 is designed to be approximately the same as the thickness of the clamping portions 112 and 122 to which the extension portions 116 and 126 are respectively connected.

Due to providing the extension portions 116 and 126, a void 106 is formed between the extension portions 116 and 126. The holding portions 110 and 120 more easily undergo flexure due to the void 106. In other words, the fulcrums for flexure of the holding portions 110 and 120 are the boundary portions between the base portion 102 and the holding portions 110 and 120, and the longer the length l from the base portion 102 to the end of the holding portions 110 and 120 is, the greater the amount of flexure that can occur is. In other words, due to providing the extension portions 116 and 126, it is possible to cause the clamping portions 112 and 122 to undergo a greater amount of flexure without changing the length of the clamping portions 112 and 122.

Also, in order to cause the clamping portions 112 and 122 to undergo a greater amount of flexure, it is preferable that positions of the through-holes 118 and 128 provided in the head portions 114 and 124 (i.e., the force points) are as far as possible from the base portion 102. In other words, it is preferable that the through-holes 118 and 128 are provided at positions in the head portions 114 and 124 that are more in the vicinity of the end on the side opposite to the side on which the base portion 102 is located. In other words, by forming the through-holes 118 and 128 as high as possible, it is possible to expand the allowable tolerance of the object 2.

According to the fixture 100 having the above structure, even with an object 2 that has a relatively large tolerance, it is possible to stably fix the object 2, and it is possible to reduce the possibility of damaging the object 2 by applying excessive constricting torque to it as in the fixtures disclosed in related technology.

c2: Second Structure Example

Although the fixture 100 having the joining hole 108 configured to conform to the shape of the outer peripheral surface of the object 2 is described as an example in the first structure example described above, a simpler configuration may be employed.

Figure 5A:
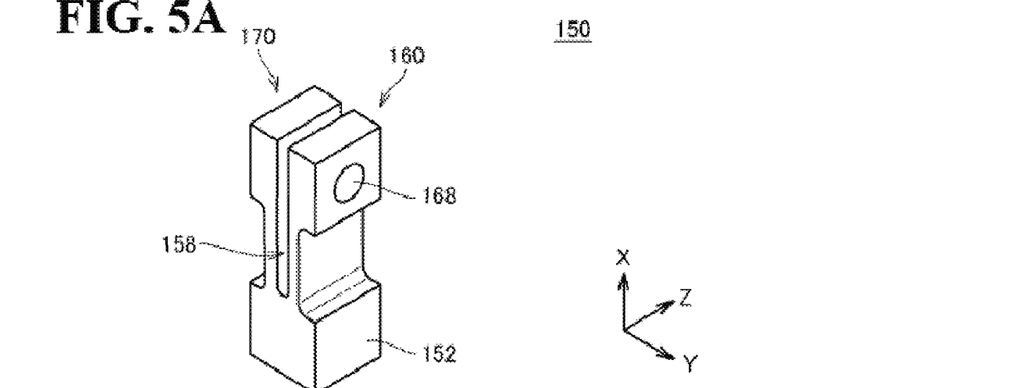
FIGS. 5A to 5C are schematic diagrams showing a second structure example for a fixture according to the embodiment.
Figure 5B:
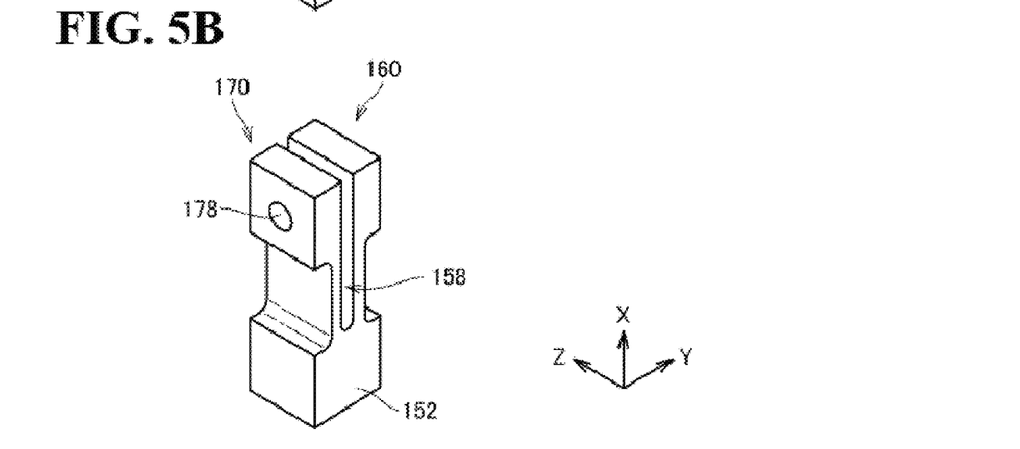
Figure 5C:
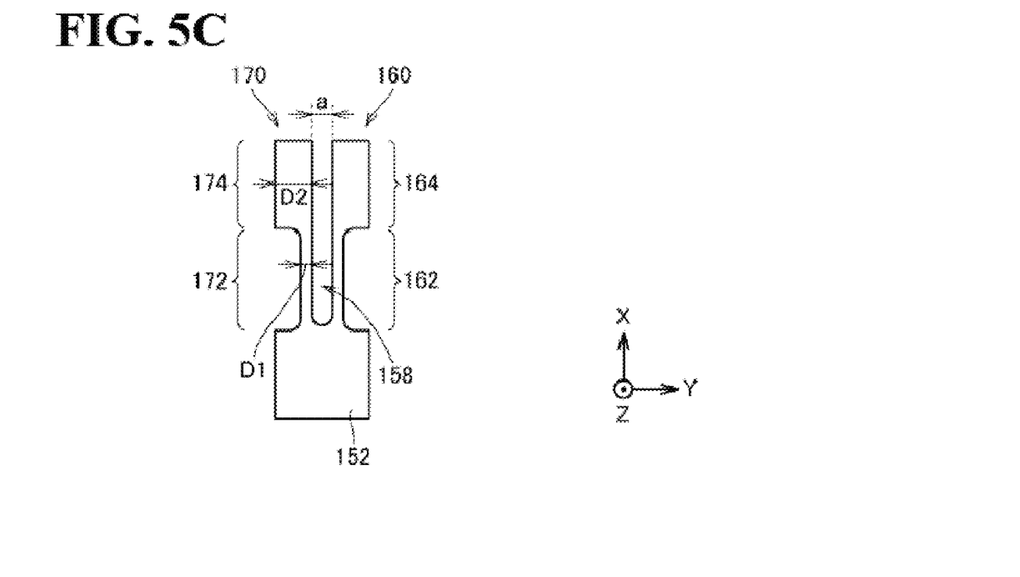

FIGS. 5A to 5C are schematic diagrams showing a second structure example for the fixture according to the present embodiment. FIG. 5A is a perspective view of the right side of a fixture 150, FIG. 5B is a perspective view of the left side of the fixture 150, and FIG. 5C is a cross-sectional plan view of the fixture 150.

As shown in FIGS. 5A to 5C, the fixture 150 is constituted by a base portion 152 and a pair of holding portions 160 and 170 that are provided on the base portion 152. The holding portions 160 and 170 include clamping portions 162 and 172 for coming into contact with the object 2 (not shown) and clamping the object 2, and head portions 164 and 174 that are provided on the side of the clamping portions 162 and 172 that is opposite to the side on which the base portion 152 is located. Through-holes 168 and 178, which are for the passage of a fastening member (typically a bolt and nut, or a screw) for adjusting the gap between the pair of holding portions 160 and 170, are provided in the head portions 164 and 174. Note that a configuration is possible in which a thread is formed in the inner surface of one of the through-holes 168 and 178, and that through-hole serves as the nut that is mated to the bolt.

A joining groove 158 that comes into contact with the object 2 is formed when the pair of holding portions 160 and 170 oppose each other. In FIGS. 5A to 5C, the object 2 is inserted into the joining groove 158 along the Z axis direction. Also, the fastening member passes through the through-holes 168 and 178 along the Y axis direction. In the fixture 150 shown in FIGS. 5A to 5C, the width of the joining groove 158 (the length of the void in the Y axis direction) is relatively small, and therefore it is envisioned that an object 2 having a relatively small outer diameter is fixed.

In the fixture 150 as well, the clamping portions 162 and 172 and the head portions 164 and 174 are configured such that the rigidity of the clamping portions 162 and 172 with respect to deformation applied by the fastening member 400 is smaller than the rigidity of the head portions 164 and 174 with respect to the same deformation. In other words, these portions are designed such that the stress generated by constriction by the fastening member 400 does not become concentrated on the object 2, the deformation of the head portions 164 and 174 themselves is relatively small, and the deformation of the clamping portions 162 and 172 themselves is relatively large.

More specifically, in the configuration of the fixture 150, a thickness D1 of the clamping portions 162 and 172 in a plane orthogonal to the axial direction of the object 2 (Z axis direction), that is to say in the XY plane, is smaller than a thickness D2 of the head portions 164 and 174 that respectively extend from the clamping portions 162 and 172. This difference in thickness obtains a structure in which the clamping portions 167 and 172 more easily undergo flexure than the head portions 164 and 174. In other words, if the thickness of the clamping portion 162 is smaller than the thickness of the corresponding head portion 164, and the thickness of the clamping portion 172 is set smaller than the thickness of the corresponding head portion 174, it is possible to realize a structure that easily undergoes flexure. It should be noted that it is preferable that the clamping portions 162 and 172 have the same thickness, that is to say that the pair of holding portions 160 and 170 are arranged symmetrically.

Also, in the fixture 150 as well, a length l from the base portion 152 to the end portions of the holding portions 160 and 170 in the plane orthogonal to the axial direction of the object 2 (Z axis direction), that is to say in the XY plane, is determined according to the tolerance prescribed for the object 2. The technique for determining the length l is similar to the content described regarding the fixture 100, and therefore a redundant detailed description will not be given here.

Also, in the fixture 150 as well, a gap "a" between the pair of head portions 164 and 174 in the plane orthogonal to the axial direction of the object 2 (Z axis direction), that is to say in the XY plane, when external force is not being applied by the fastening member 400 is determined according to the allowable amount of stress that can be applied to the object 2. In other words, the gap "a" between the pair of head portions 164 and 174 is designed such that the stress that is applied to the object 2 when the fastening member 400 generates flexure that enables the pair of head portions 164 and 174 to come into contact with each other is less than or equal to the allowable value. The technique for determining the gap "a" between the pair of head portions 164 and 174 is similar to that described regarding the fixture 100, and therefore a redundant detailed description will not be given here.

Also, in order to cause the clamping portions 162 and 172 to undergo a greater amount of flexure, it is preferable that positions of the through-holes 168 and 178 provided in the head portions 164 and 174 (i.e., the force points) are as far as possible from the base portion 152. In other words, it is preferable that the through-holes 168 and 178 are provided at positions in the head portions 164 and 174 that are more in the vicinity of the end on the side opposite to the side on which the base portion 152 is located. In other words, by forming the through-holes 168 and 178 as high as possible, it is possible to expand the allowable tolerance of the object 2.

According to the fixture 150 having the above structure, even with an object 2 that has a relatively large tolerance, it is possible to stably fix the object 2, and it is possible to reduce the possibility of damaging the object 2 by applying excessive constricting torque to it as in the fixtures disclosed in related technology.

c3: Simulation Results

Figure 6A:
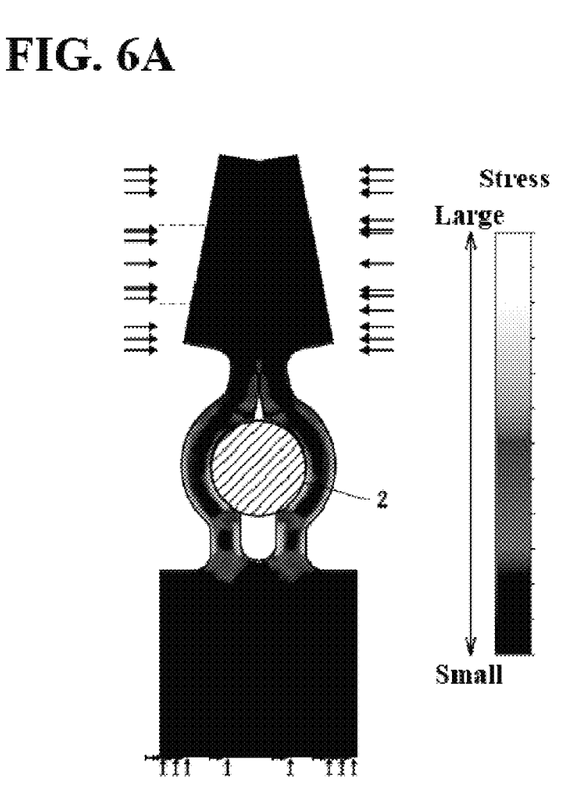
FIGS. 6A and 6B are diagrams showing examples of results of simulations regarding the fixture according to the embodiment shown in FIGS. 3A to 3C.
Figure 6B:
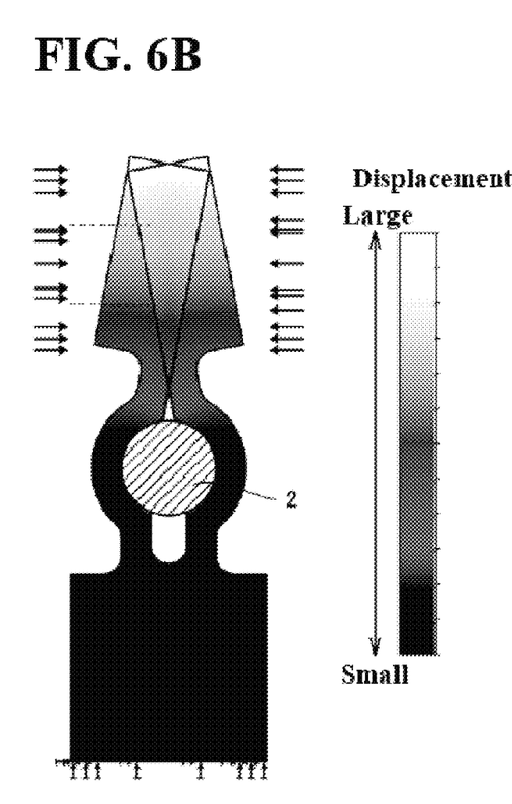
Figure 7A:
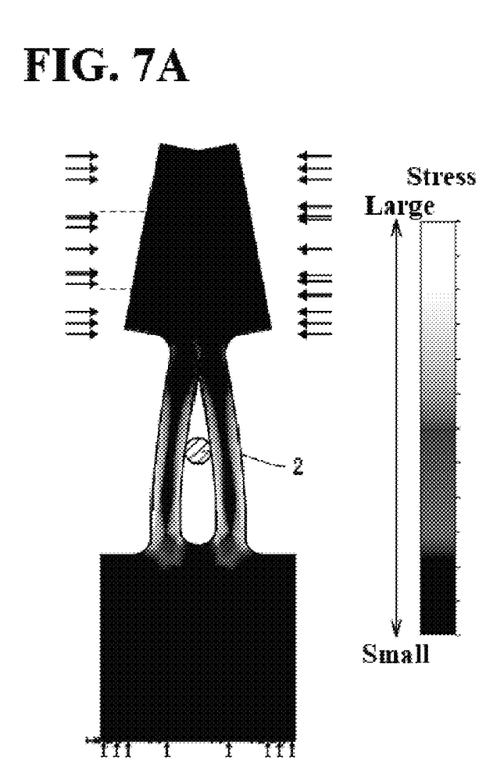
FIGS. 7A and 7B are diagrams showing examples of results of simulations regarding the fixture according to the embodiment shown in FIGS. 5A to 5C.
Figure 7B:
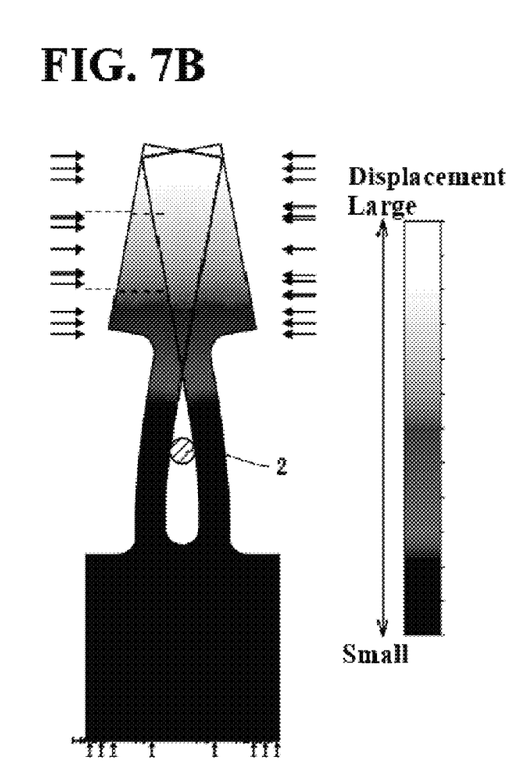

Simulations were performed regarding the shapes of the fixture 100 and the fixture 150 shown in FIGS. 3A to 3C and 5A to 5C respectively. FIGS. 6A and 6B are diagrams showing examples of results of the simulation regarding the fixture 100 according to the present embodiment shown in FIGS. 3A to 3C. FIGS. 7A and 7B are diagrams showing examples of results of the simulation regarding the fixture 150 according to the present embodiment shown in FIGS. 5A to 5C. In the simulations shown in FIGS. 6A and 6B and 7A and 7B, the position where the object 2 is fixed was estimated, and the amounts of stress and displacement that would occur in various portions when constricting the upper portions were calculated. FIGS. 6A and 7A show stress distributions, and FIGS. 6B and 7B show displacement distributions.

According to the simulation results shown in FIG. 6A, it is understood that in the case of the fixture 100 shown in FIGS. 3A to 3C, a greater amount of stress occurs in the portions other than the portions that come into contact with the object 2 and fix the object 2. Also, according to the simulation results shown in FIG. 6B, a relatively large amount of displacement occurs in the upper portions that come into contact with the object 2, and therefore it is thought that the amount of stress applied to the object 2 has been reduced.

In the fixture 100 shown in FIGS. 3A to 3C, the object 2 and the holding portions 110 and 120 come into one type of surface contact. In the simulation results shown in FIG. 6A, the stress generated in the portions that fix the object 2 is suppressed to approximately 62% of the maximum value of stress that occurred in the fixture, and it is understood that it was possible to avoid the phenomenon in which excessive stress is applied to the object 2.

According to the simulation results shown in FIG. 7A, it is understood that in the case of the fixture 150 shown in FIGS. 5A to 5C, a greater amount of stress occurs in the portions other than the portions that come into contact with the object 2 and fix the object 2. It should be noted that in comparison to the fixture 100 shown in FIGS. 3A to 3C, in the fixture 150 shown in FIGS. 5A to 5C, the area of the portions that come into contact with the object 2 is comparatively smaller, and a somewhat large amount of stress is generated in the portions that come into contact with the object 2. Also, according to the simulation results shown in FIG. 7B, a relatively large amount of displacement occurs in the upper portions that come into contact with the object 2, and therefore it is thought that the amount of stress applied to the object 2 has been reduced.

In the fixture 150 shown in FIGS. 5A to 5C, the object 2 and the holding portions 160 and 170 come into one type of linear contact. In the simulation results shown in FIG. 7A, the stress generated in the portions that fix the object 2 is suppressed to approximately 75% of the maximum value of stress that occurred in the fixture, and it is understood that it was possible to avoid the phenomenon in which excessive stress is applied to the object 2. It should be noted that in comparison with the simulation results shown in FIG. 6A, a comparatively large amount of stress, relative to the maximum amount of stress, occurred in the portions that come into contact with the object 2, and this is thought to be caused by the fact that the area of the portions that come into contact with the object 2 is lower. In other words, it can be said that using the fixture 150 shown in FIGS. 3A to 3C is more preferable for an object 2 that is cylindrical, for example.

According to the above simulation results, it is understood that in both of the fixtures, the portions subjected to constricting torque, that is to say the portions that are to undergo a shape change, undergo sufficient deformation, whereas the amount of deformation is relatively small in the portions that come into contact with the object 2, that is to say the portions that are not to undergo a shape change.

D. Advantages

By using the fixture according to the present embodiment, even in the case of a tube-shaped object that has a certain extent of tolerance, it is possible to appropriately fix the object without damaging the object. By employing the configurations described above, a tube-shaped object whose outer diameter has a relatively large amount of variance can be fixed by a one-point fastening member. In other words, by tightening a fastening member, portions for fixing the outer periphery of the object undergo deformation, thus coming into contact with the object and fixing it, and when a prescribed amount of constricting torque is applied to the fastening member, the head portions come into contact with each other and prevent excessive stress from being applied to the object.

By employing the configurations described above, even if force greater than a reference constricting torque is applied to the fastening member, the head portions come into contact with each other, thus making it possible to prevent more stress than necessary from being applied to the object. Since the amount of stress applied to the object can be limited, it is possible to appropriately fix a flexible object as well. Also, the amount of deformation that occurs in the head portions of the fixture is proportional to the amount of constricting torque that is applied to the fastening member, and therefore by appropriately designing the gap between the head portions (the slit gap), it is possible to omit the inconvenience of managing the constricting torque with a torque wrench or the like.

The embodiment disclosed herein is an example in all aspects and is not to be construed as restricting. The scope of the present invention is shown by the claims rather than the description above, and is intended to cover all equivalents to the claims and all modifications in the claims.

The invention claimed is:

1. A fixture for fixing a tube-shaped object, the fixture comprising:
   a base portion; and
   a pair of holding portions provided on the base portion, wherein the holding portions each include
      a clamping portion for coming into contact with the object and clamping the object, and
      a head portion that is provided on a side of the clamping portion that is opposite to a side on which the base portion is located, and that is provided with a through-hole for passage of a fastening member for adjusting a gap between the pair of holding portions,
   the clamping portions and the head portions are configured such that a rigidity of the clamping portions is smaller than a rigidity of the head portions, and
   a distance from the base portion to end portions of the holding portions in a plane orthogonal to an axial direction of the object is set according to a tolerance value of an outer diameter of the object, and the gap between the pair of holding portions when an external force is not being applied to the pair of holding portions by the fastening member is set according to a stress limit of the object.

2. The fixture according to claim 1, wherein a thickness of the clamping portions in the plane orthogonal to the axial direction of the object is configured to be smaller than a thickness of the head portions extending from the clamping portions.

3. The fixture according to claim 1, wherein the distance from the base portion to the end portions of the holding portions is set such that an amount of flexure that occurs at a position where the object is arranged is greater than or equal to ½ the tolerance value of the outer diameter of the object.

4. The fixture according to claim 1, wherein the gap between the pair of head portions is set such that a stress applied to the object when the fastening member causes flexure of the pair of holding portions for causing the pair of head portions to come into contact with each other is less than or equal to the stress limit of the object.

5. The fixture according to claim 1, wherein the clamping portions are configured to conform to a shape of an outer peripheral surface of the object.

6. The fixture according to claim 5, wherein a cross-sectional shape of the object is cylindrical or polygonal.

7. The fixture according to claim 5, wherein the holding portions each further include an extension portion provided between the clamping portion and the base portion.

8. The fixture according to claim 1, wherein the through-holes are provided at positions in the head portions that are more in a vicinity of an end on a side opposite to a side on which the base portion is located.

* * * * *